United States Patent
Kämmerer et al.

(10) Patent No.: US 9,322,938 B2
(45) Date of Patent: Apr. 26, 2016

(54) DETECTOR MODULE FOR A RADIATION DETECTOR AND RADIATION DETECTOR

(75) Inventors: Peter Kämmerer, Schnaittach (DE);
Thomas Reichel, Heroldsbach (DE);
Stefan Wirth, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 876 days.

(21) Appl. No.: 13/046,873

(22) Filed: Mar. 14, 2011

(65) Prior Publication Data

US 2011/0226951 A1    Sep. 22, 2011

(30) Foreign Application Priority Data

Mar. 16, 2010    (DE) .......................... 10 2010 011 582

(51) Int. Cl.
*G01T 1/16*    (2006.01)
*G01T 1/29*    (2006.01)

(52) U.S. Cl.
CPC .................................... *G01T 1/2985* (2013.01)

(58) Field of Classification Search
USPC ............ 250/363.02, 363.04, 370.08, 370.09, 250/370.11
See application file for complete search history.

(56) References Cited

U.S. PATENT DOCUMENTS

| | | | |
|---|---|---|---|
| 4,912,545 A | 3/1990 | Go | |
| 6,133,574 A * | 10/2000 | Blendinger | 250/370.11 |
| 6,292,528 B1 * | 9/2001 | Wieczorek et al. | 378/19 |
| 6,396,898 B1 * | 5/2002 | Saito et al. | 378/19 |
| 6,510,195 B1 * | 1/2003 | Chappo et al. | 378/19 |
| 6,635,866 B2 * | 10/2003 | Chan et al. | 250/239 |
| 6,841,784 B2 | 1/2005 | Brahme | |
| 6,933,505 B2 | 8/2005 | Vuorela | |
| 7,223,981 B1 | 5/2007 | Capote et al. | |
| 7,259,376 B2 * | 8/2007 | Pohan | 250/370.09 |
| 7,504,637 B2 * | 3/2009 | Thorne | 250/370.09 |
| 7,531,809 B2 * | 5/2009 | Capote et al. | 250/370.13 |

(Continued)

FOREIGN PATENT DOCUMENTS

| | | |
|---|---|---|
| CN | 1955760 A | 5/2007 |
| CN | 201402865 Y | 2/2010 |

(Continued)

OTHER PUBLICATIONS

German Priority application 10 2010 011 582.7 (not yet published).

(Continued)

*Primary Examiner* — David Porta
*Assistant Examiner* — Djura Malevic
(74) *Attorney, Agent, or Firm* — Harness, Dickey & Pierce, P.L.C.

(57) ABSTRACT

A detector module for a radiation detector is disclosed. In at least one embodiment, the detector module includes a converter layer with contacts, arranged distributed over an area on the rear side, for transmitting electrical signals, wherein the contacts are routed, by way of rewiring, to target contacts on a target region that is smaller than this area. This provides the conditions for simple and secure signal routing between the contacts on the converter layer and readout electronics. In particular, this is successful if a substrate layer used for stabilization purposes has a cutout for the target region, through which cutout the target contacts are directly connected to the signal-routing lines of readout electronics.

14 Claims, 2 Drawing Sheets

(56) References Cited

U.S. PATENT DOCUMENTS

| | | | |
|---|---|---|---|
| 7,564,940 B2 * | 7/2009 | Mattson et al. | 378/19 |
| 7,582,879 B2 * | 9/2009 | Abenaim et al. | 250/370.11 |
| 7,606,346 B2 | 10/2009 | Tkaczyk et al. | |
| 7,645,998 B2 * | 1/2010 | Danzer et al. | 250/370.11 |
| 7,769,128 B2 * | 8/2010 | Ratzmann | 378/19 |
| 7,838,994 B2 * | 11/2010 | Shibayama et al. | 257/774 |
| 2002/0064252 A1 | 5/2002 | Igarashi et al. | 378/19 |
| 2002/0070343 A1 * | 6/2002 | Hoffman | 250/367 |
| 2002/0163993 A1 * | 11/2002 | Hoffman et al. | 378/19 |
| 2003/0016779 A1 * | 1/2003 | Pohan et al. | 378/19 |
| 2004/0004189 A1 | 1/2004 | Brahme et al. | |
| 2004/0065465 A1 * | 4/2004 | Chappo et al. | 174/66 |
| 2005/0012047 A1 * | 1/2005 | Pohan | 250/370.09 |
| 2006/0071173 A1 * | 4/2006 | Zeman et al. | 250/370.11 |
| 2008/0165921 A1 | 7/2008 | Tkaczyk et al. | |
| 2008/0253507 A1 * | 10/2008 | Levene et al. | 378/19 |

FOREIGN PATENT DOCUMENTS

| | | |
|---|---|---|
| DE | 102007062891 A1 | 7/2008 |
| DE | 102008048044 A1 | 4/2010 |
| JP | 2009074964 A | 4/2009 |

OTHER PUBLICATIONS

German Office Action (not yet published).

* cited by examiner

DETECTOR MODULE FOR A RADIATION DETECTOR AND RADIATION DETECTOR

PRIORITY STATEMENT

The present application hereby claims priority under 35 U.S.C. §119 on German patent application number DE 10 2010 011 582.7 filed Mar. 16, 2010, the entire contents of which are hereby incorporated herein by reference.

FIELD

At least one embodiment of the invention generally relates to a detector module for a radiation detector and/or to a radiation detector with such detector modules.

BACKGROUND

The radiation detectors used in X-ray tomography scanners, e.g. computed tomography scanners, are generally made up of a plurality of detector modules arranged next to one another without interruption. Each detector module has a converter layer, which serves for converting incident X-ray quanta into electrical signals and is structured in a pixel-like fashion in order to obtain a certain spatial resolution. In order to ensure a certain mechanical stability of the detector module, a substrate layer is arranged on the rear side of the converter layer when viewed from the direction that radiation is incident.

Until now, computed tomography scanners have utilized an indirect conversion converter layer as a converter layer. In this type of detector, there is a two-stage conversion of the radiation quanta. In a first stage, the X-ray quanta are absorbed by way of a scintillator and converted into optically visible light pulses. The generated light pulses are subsequently converted into electrical signals in a second stage by way of a photodiode array that is optically coupled to the scintillator. The signals generated thus are usually read out on the rear side of the photodiode array by way of electrical contacts, which are arranged distributed over the area of the photodiode array. Since the substrate layer is also arranged on this side of the photodiode array, the signals must, for further processing, be routed through the substrate layer to readout electronics.

The contacts on the sides of the photodiode array are therefore firstly connected to corresponding first contacts on the substrate layer by adhesive bonding processes or soldering processes and then, within the substrate layer, are routed to corresponding second contacts on the underside of the substrate layer via metallic connections. These second contacts in turn are connected to contact points on a printed circuit board by adhesive bonding processes or soldering processes, which are routed to the readout electronics through circuit-board conductors introduced onto the printed circuit board.

The signal routing between the converter layer and the readout electronics is connected with much production complexity in the case of such an embodiment of a detector module. Moreover, failures of individual signal routings and also the entire detector module have been observed.

SUMMARY

In at least one embodiment of the invention, a detector module for a radiation detector and a radiation detector are disclosed such that the conditions are created for simple and reliable signal routing between contacts on a converter layer and on readout electronics.

At least one embodiment is directed to a detector module and at least one other embodiment is directed to a radiation detector. Advantageous embodiments and developments are the subject matter of the dependent claims.

In order to obtain a certain spatial resolution, the converter layer has a pixel-like structure. Here, electrical signals are generated for each pixel depending on absorption events registered by the pixel, which signals can be read out by the contacts arranged on the rear side. Thus, there are corresponding contacts for each pixel, which contacts are arranged distributed over the entire area of the detector module in accordance with the structure of the pixels.

At least one embodiment of the invention uses, as a starting point, the discovery that the failure of individual signal routings or the failure of the entire detector module is often caused by a fault in the connection of the contacts between the converter layer and the substrate layer. Such a fault may be caused by a difference in the present thermal expansion properties of the converter layer and the substrate layer. This is because changing thermal conditions during the operation of the detector module and during the production thereof place mechanical loads on the contact connections, which may result in a loss of contact.

In at least one embodiment, the inventors have identified that the faults in the contact between the converter layer and the substrate layer in the case of changing thermal conditions can be reduced significantly precisely if the contacts arranged on the rear side of the converter layer are concentrated into a substantially smaller target region. The position at which the target region is arranged with respect to the area of the converter layer is irrelevant to the invention. An expedient variant includes placing the target region centrally with respect to the area of the converter layer.

Accordingly, the detector module according to at least one embodiment of the invention for a radiation detector comprises a converter layer with contacts, arranged distributed over an area on the rear side, for transmitting electrical signals, wherein the contacts are routed, by way of rewiring, to target contacts on a target region that is smaller than this area.

Within the context of at least one embodiment of the invention, the rear side is respectively understood to be that side of a layer that can be considered to be the rear side of said layer when viewed from the direction of radiation incidence if the detector module is used as intended.

The rewiring preferably is brought about in a rewiring layer. Such rewiring can be implemented by a standard process known from silicon technology and allows the arrangement of contacts with a spacing of less than 100 μm. Depending on the size of the detector module, this rewiring can reduce the area on which the contacts are arranged in a distributed fashion by a factor of $10^3$. The mechanical load on the contact connections as a result of thermal expansion then also reduces by the same amount. The risk of contact being lost has therefore been significantly reduced. As a result of the small amount of area required for the concentrated target contacts, there furthermore are no problems with thermal expansion during soldering processes either.

A substrate layer is arranged on the radiation output side for the purpose of mechanical stabilization of the detector module, which substrate layer has a cutout in the target region for electrically contacting the target contacts in the target region.

Previously, the substrate layer had to satisfy both a mechanical and an electrical function. To be specific, the electrical function has until now comprised the electrical through-plating of the converter-side contacts in the direction of the readout electronics. However, possible materials with suitable coefficients of thermal expansion that satisfy both functions (e.g. HTCC, LTCC, etc.) are relatively expensive. By concentrating the converter-side contacts onto target contacts in a target region with a very small spatial extent, it is merely a single cutout that is required in the carrier substrate in order to allow direct contacting of the converter layer with the onward transporting signal lines without interconnecting the substrate layer. Therefore, the substrate layer no longer has to satisfy an electrical function and must merely be optimized in respect of the purely mechanical function. Thus, the substrate layer can be matched to the expansion coefficient of silicon in an optimum fashion. Moreover, materials with suitable mechanical properties are available and cost-effective.

Thus, the direct connection between the converter-side contacts and the onward transporting signal lines also dispenses with the need to make a contact to contacts on the front side of the substrate layer, which is also necessary if the substrate layer is interconnected. Thus, previously required soldering steps and underfill processes in the manufacture of the detector module are dispensed with. This simplifies the production process and reduces weak points in the respective signal routing. The measures for electrical through-plating of the substrate layer in particular are complicated, and so there are significant savings in the production of the substrate layer as a result of the loss of the electrical function.

As a result of the loss of the electrical function, it is also no longer necessary for the substrate layer to be aligned that precisely with respect to the converter layer as was required until now in the production of an electrical contact between the layers. The concentration of the target contacts on a target region with a very small spatial extent moreover provides sufficient space for adjusting and mounting the substrate layer in the case of a correspondingly large cutout.

In an advantageous development of at least one embodiment of the invention the target contacts are connected to readout electronics over flexible circuit-board conductors. As a result, the connection is robust against mechanical influences such as vibrations and shocks. By way of example, a possible connection is an anisotropic conductive film (ACF) connection, in which an anisotropic conductive adhesive is utilized, which allows the formation of very precise adhesive bonding sites at extremely low process temperatures. Advantageously, in addition to the adhesive bonding connections, soldered connections are also possible for contacting the target contacts with the circuit-board conductors.

In the process, the flexible circuit-board conductors are preferably part of a flexible printed circuit board. Such circuit boards are routinely used in LCD monitors and can be produced cost-effectively and with little effort. In a further embodiment of the invention, at least part of the readout electronics is arranged directly on the flexible printed circuit board. This thus allows the direct mounting of e.g. an ASIC comprising the readout electronics or other components on the flexible printed circuit board. This production method is also known by the term chip on flex (COF).

Further aspects of at least one embodiment of the invention relate to a radiation detector for a computed tomography scanner, which comprises a plurality of such detector modules.

BRIEF DESCRIPTION OF THE DRAWINGS

In the following text, the invention is explained in more detail on the basis of example embodiments and on the basis of drawings, in which.

Figure 1:
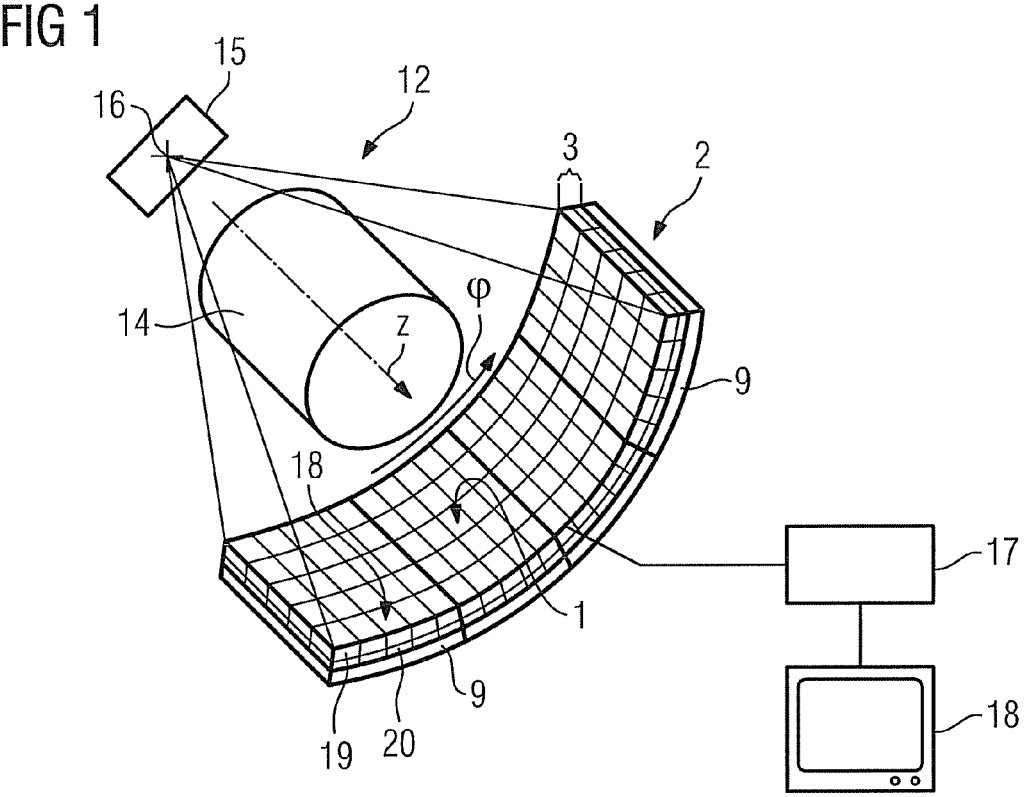
FIG. 1 shows a schematic illustration of a computed tomography scanner with a radiation detector comprising detector modules according to an embodiment of the invention.

In the figures, identical or functionally identical elements have been denoted by the same reference sign. In the case of repeating elements within one figure, only one element has in each case been provided with a reference sign for reasons of clarity. The illustrations in the figures are schematic and not necessarily true to scale, with the scale being able to vary between the figures.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 illustrates, partly in a perspective view and partly in a block-diagram-like view, an X-ray tomography scanner in the form of a computed tomography scanner 12. The computed tomography scanner 12 comprises a patient support table (not illustrated) for supporting a patient 14 to be examined. It furthermore comprises a gantry (not illustrated) with a recording system 15, 2 that is mounted such that it can rotate about a system axis Z. The recording system 15, 2 has an X-ray tube 15 and, arranged opposite thereto, a radiation detector 2 according to the invention, and so X-ray radiation emanating from the focus 16 of the X-ray tube 15 passes through the patient during operation and impinges on the radiation detector 2.

In order to record an image of an examination region, projections are registered from a multiplicity of different projection directions as the recording system 15, 2 rotates about the system axis Z. In the case of a helical scan, there is e.g. simultaneous continuous adjustment of the patient support table in the direction of the system axis Z during a rotation of the recording system 15, 2. Hence the recording system 15, 2 moves around the patient 14 along a helical path in this type of scan. The electrical signals registered by the radiation detector 2 during the scan are serialized in a sequencer and subsequently transmitted to an imaging computer 17. The imaging computer 17 contains a reconstruction unit, which calculates an image from the signals. The image can be displayed on a display unit 18, e.g. a video monitor, connected to the imaging computer 17.

The radiation detector 2 according to an embodiment of the invention is segmented into a plurality of detector modules 1 that are arranged next to one another without interruption in the φ-direction. Each detector module 1 has a converter layer 3, in which the incident X-ray quanta are converted into the electrical signals. It is structured in the form of individual pixels 18 in order to obtain a certain spatial resolution. The shown radiation detector 2 is an indirect conversion detector.

The conversion into electrical signals therefore proceeds in two stages. In a first stage, the X-ray quanta are absorbed in a scintillator array 19 and converted into optically visible light pulses. The generated light pulses are subsequently converted into electrical signals in a second stage by a photodiode array 20 that is optically coupled to the scintillator array 19. The radiation detector 2 is operated in an integrating mode. However, it would likewise be feasible for the radiation detector to be embodied as a counting detector for energy-selective registering of individual absorption events in high-flux applications with flux rates of more than $10^8$ X-ray quanta/(mm$^2$*s). For this purpose, direct converters, e.g. direct converters on the basis of CdTe-, CdZnTe- or CdZnTeSe-semiconductor compounds, can also be considered in addition to the indirect-conversion approach.

Figure 2:
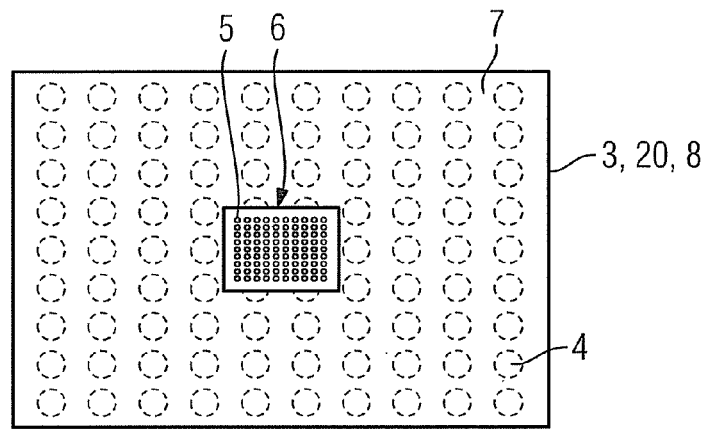
FIG. 2 shows a rear-side view of a converter layer of the detector module according to an embodiment of the invention with target contacts arranged in a target region.

FIG. 2 shows a rear-side view of a converter layer 3 of the detector module 2 according to an embodiment of the invention. The electrical signals generated by the photodiode array 20 can be read out from the contacts 4, shown in a dashed fashion, on the rear side of the photodiode array 20. They are covered by a rewiring layer 8, which can be identified in FIG. 4. Within the rewiring layer 8, the contacts 4 are routed to target contacts 5. By way of example, this is brought about by layer-by-layer deposition of a conductive material to form corresponding signal routings. Such processes are well known in silicon technology. In this exemplary embodiment, the target contacts 5 are arranged with a spacing of approximately 100 µm from one another in a very small target region 6.

Figure 3:
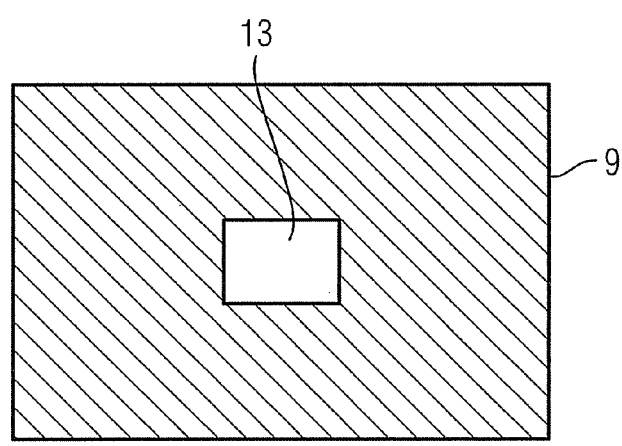
FIG. 3 shows a rear-side view of a substrate layer of the detector module according to an embodiment of the invention with a cutout with dimensions of the target region.

FIG. 3 shows, in a rear-side view, a substrate layer 9 of the detector module 1 according to an embodiment of the invention with a cutout 13 with the dimensions of the target region 6, which substrate layer assumes a purely mechanical function for stabilizing the detector module 2. Here the cutout has been selected such that there is enough play for adjusting and mounting. By way of example, the material can be glass or ceramic. These materials have a comparable expansion coefficient to silicon, and hence to the photodiode array 20, and so mechanical stresses in the case of changing temperature conditions are negligibly small. The substrate layer 9 forms a frame, which is adhesively bonded to the converter layer for producing a detector module 2 such that the target region 6 remains uncovered for direct contacting of the target contacts 5.

Figure 4:
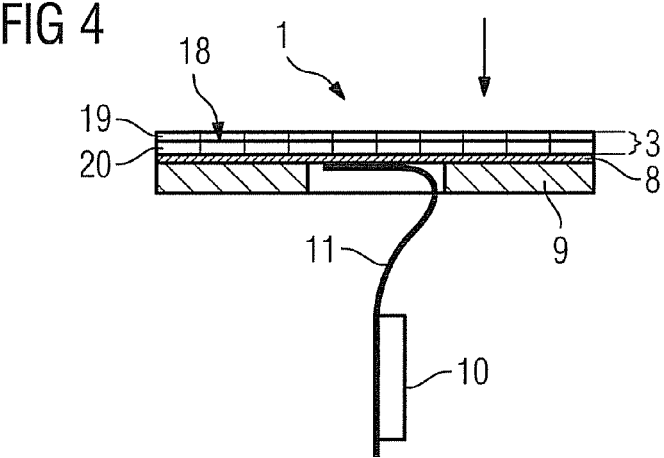
FIG. 4 shows a side view of the detector module according to an embodiment of the invention.

FIG. 4 shows a side view of a fully built detector module 2. The target contacts 5 are electrically connected to flexible circuit-board conductors via an adhesive connection, for example by means of an ACF adhesive. To this end, the circuit-board conductors are routed through the cutout 13 present in the substrate layer 9. The flexible circuit-board conductors are part of a flexible printed circuit board 11, as is used in e.g. LCD monitors. The readout electronics 10, in the form of an ASIC, are arranged directly on the flexible printed circuit board 11 in this exemplary embodiment. The connection is brought about according to COF technology, which is known for this purpose.

A manufacturing procedure for the detector module shown in FIG. 4 therefore comprises the following essential method steps:

a) providing a converter layer with contacts 4, arranged distributed over an area 7 on the rear side, for transmitting electrical signals, b) routing the contacts 4, by way of rewiring, to target contacts 5 onto a target region 6, for example in a rewiring layer, that is smaller than this area, c) attaching a substrate layer, which has a cutout 13 in the target region 6 for electrically contacting the target contacts 5, and d) contacting the target contacts with flexible circuit-board conductors, which transmit the electrical signals to readout electronics.

In conclusion, the following statement can be made:

An embodiment of the invention relates to a detector module 1 for a radiation detector 2, comprising a converter layer 3 with contacts 4, arranged distributed over an area 7 on the rear side, for transmitting electrical signals, wherein the contacts 4 are routed, by way of rewiring, to target contacts 5 on a target region 6 that is smaller than this area. This provides the conditions for simple and secure signal routing between the contacts 4 on the converter layer 3 and readout electronics 10. In particular, this is successful if a substrate layer 9 used for stabilization purposes has a cutout for the target region 6, through which cutout the target contacts 5 are directly connected to the signal-routing lines of readout electronics 10.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detector module for a radiation detector, comprising:
   a converter layer including contacts, arranged distributed over an area on a rear side of the converter layer, to transmit electrical signals;
   a rewiring layer on the rear side of the converter layer, the rewiring layer including conductive deposited layers;
   a target region on a rear side of the converter layer, the target region being smaller than the area of the rear side of the converter layer;
   a substrate layer arranged on a radiation output side of the detector module for mechanical stabilization of the detector module, the substrate layer including a through-hole cutout opposite the target region;
   wherein the contacts are covered by the rewiring layer and the contacts are routed, by the rewiring layer, to target contacts on the target region and a connector passes through the substrate via the through-hole cutout in the substrate layer.

2. The detector module as claimed in claim 1, wherein the target contacts are connected to readout electronics over flexible circuit-board conductors.

3. The detector module as claimed in claim 2, wherein the flexible circuit-board conductors are part of a flexible printed circuit board.

4. The detector module as claimed in claim 3, wherein at least part of the readout electronics is arranged directly on the flexible printed circuit board.

5. The detector module as claimed in claim 2, wherein the connections between the target contacts and the circuit-board conductors are soldered connections or adhesively bonded connections.

6. A radiation detector for a computed tomography scanner, comprising a multiplicity of detector modules as claimed in claim 1.

7. The detector module as claimed in claim 1, wherein the target contacts are connected to readout electronics via flexible circuit-board conductors directly connected to the rewiring layer via the through-hole cutout in the substrate layer.

8. The detector module as claimed in claim 7, wherein the target contacts are connected to readout electronics over the flexible circuit-board conductors.

9. A radiation detector for a computed tomography scanner, comprising a multiplicity of the detector modules as claimed in claim 2.

10. The detector module as claimed in claim 1, wherein the target region is directly over the through-hole cutout.

11. The detector module as claimed in claim 1, wherein a flexible circuit board passes through the through-hole cutout in the substrate layer and contacts the target contacts.

12. The detector module as claimed in claim 1, wherein the converter layer is directly on a surface of the rewiring layer and the rewiring layer is directly on a surface of the substrate layer.

13. The detector module as claimed in claim 1, wherein the substrate layer is not electrically connected to the rewiring layer.

14. The detector module as claimed in claim 1, wherein the coefficient of expansion of the substrate layer matches the coefficient of expansion of silicon.

* * * * *